(12) United States Patent
Ogawa et al.

(10) Patent No.: US 6,794,034 B2
(45) Date of Patent: Sep. 21, 2004

(54) RESIN COMPOSITION, MOLDING MATERIAL, AND MOLDED OBJECT

(75) Inventors: Masanori Ogawa, Tokai (JP); Seinosuke Horiki, Takai (JP); Takehiko Kajita, Tokai (JP); Kuninori Itou, Tokai (JP)

(73) Assignee: Nagoya OilChemical Co., Ltd., Aichi (JP)

( * ) Notice: Subject to any disclaimer, the term of this patent is extended or adjusted under 35 U.S.C. 154(b) by 0 days.

(21) Appl. No.: 10/203,360

(22) PCT Filed: Feb. 5, 2001

(86) PCT No.: PCT/JP01/00809
§ 371 (c)(1),
(2), (4) Date: Aug. 7, 2002

(87) PCT Pub. No.: WO01/58978
PCT Pub. Date: Aug. 16, 2001

(65) Prior Publication Data
US 2003/0088025 A1 May 8, 2003

(30) Foreign Application Priority Data
Feb. 7, 2000 (JP) .......................................... 2000-029496

(51) Int. Cl.⁷ ........................ B32B 27/04; B32B 27/38; C08L 63/00
(52) U.S. Cl. ................ 428/396; 428/297.4; 428/304.4; 428/323; 428/413; 523/400; 523/402; 525/396
(58) Field of Search ................. 428/413, 414, 428/396, 297.4, 304.4, 323; 523/400, 402; 525/403, 405, 390, 396; 524/508, 510, 512

(56) References Cited

U.S. PATENT DOCUMENTS

| 4,524,107 A | * | 6/1985 | Marchetti et al. ............ 428/413 |
| 4,560,714 A | * | 12/1985 | Gajria et al. ................. 523/409 |
| 4,769,437 A | * | 9/1988 | Blount ......................... 528/95 |

FOREIGN PATENT DOCUMENTS

| JP | 7-10946 | * | 1/1995 | ............ C08G/14/06 |
| JP | 9-206885 | * | 8/1997 | ............. B22C/9/12 |
| JP | 11-343455 | * | 12/1999 | ......... C09D/163/00 |

* cited by examiner

Primary Examiner—Philip C. Tucker
Assistant Examiner—Michael J. Feely
(74) Attorney, Agent, or Firm—Cooper & Dunham LLP; Donald S. Dowden (57) ABSTRACT

A phenolic resin composition in which the phenolic resin can be smoothly cured at a low temperature while inhibiting the generation of free formaldehyde and trapping free phenol. An epoxy compound is dispersed or dissolved as a hardener in an aqueous phenolic resin solution. The epoxy compound functions not only as a hardener for the phenolic resin but as a trapping agent for free phenol. The phenolic resin has been sulfoalkylated and/or sulfialkylated so as to have improved hydrophilicity.

14 Claims, 2 Drawing Sheets

RESIN COMPOSITION, MOLDING MATERIAL, AND MOLDED OBJECT

This application is a 371 ofPCT/JP01/00809, filed Feb. 5, 2001, published as WO 01/58978 on Aug. 16, 2001; and claims foreign priority to JP 2000-29496, filed Feb. 7, 2000.

FIELD OF THE INVENTION

The present invention relates to a resin composition used as an impregnating material, binder, paint, adhesive and the like, a molding material using said resin composition, and a molded article using said molding material.

BACKGROUND OF THE INVENTION

Up to now phenolic resin has been used as an impregnating material for fiber sheets and the like, a binder of wood flake, fiber material and the like, paint, adhesive and the like, and formaldehyde or formaldehyde donor such as hexamethylenetetramine and the like are used as a curing agent of said phenolic resin.

Nevertheless in a case where said curing agent is used, said curing agent emits formaldehyde when phenolic resin is cured, and further formaldehyde remains in phenolic resin after curing so that there is problem that formaldehyde emitted from the molded article manufactured by molding and curing the molding material in which phenolic resin is impregnated contaminates environment.

Accordingly, the object of the present invention is to provide a resin composition and a molding material impregnated with said resin composition and a molding article of designated shape which is molded out of said molding material which emit no formaldehyde which emits no formaldehyde when or after said resin composition is cured.

DISCLOSURE OF THE INVENTION

To solve above described problem, the present invention provides a molding material comprising of a porous material impregnated with said resin composition comprising aqueous solution of phenolic resin and epoxy compound. In said resin composition with which said molding material is impregnated, since said epoxy compound acts as a curing agent of phenolic resin, it is not necessary to use formaldehyde or formaldehyde donor such as hexamethylenetetramine as curing agent so that said resin composition does not emit formaldehyde, when or after said resin composition is cured, not to contaminate environment.

In said resin composition with which said molding material is impregnated, aminoplast monomer and/or its precondensate may be co-condensated with said phenolic resin and further, aminoplast resin and/or aminoplast monomer may be mixed in said resin composition.

Furthermore, in said resin composition with which said molding material is impregnated, said epoxy compound is desirably dispersed or emulsified in water and then mixed in said aqueous solution of phenolic resin and it is desirable that said phenolic resin is partially or wholly sulfoalkylated and/or sulfialkylated.

Still further, said epoxy compound is desirably epoxy resin and in this case said epoxy resin has desirably aryl group and more desirably said aryl group is partially or wholly sulfoalkylated and/or sulfialkylated.

In said molding material, said phenolic resin in said resin composition is desirably to be in B-stage.

In addition, the present invention provides a molding article manufactured by molding said molding material with heating in a designated shape to cure said resin composition in said molding material.

Additionally, the present invention provides a molding material consisting of chip and/or powder and/or fiber material in which a resin composition comprising of a mixture of aqueous solution of phenolic resin and epoxy compound is mixed as a binder and a molded article manufactured through molding said molding material by heating into a designated shape, curing said resin composition in said molding material.

BRIEF DESCRIPTION OF THE DRAWINGS

FIGS. 1 to 3 show an embodiment of the present invention.

In the drawings, (11) base member
(12) cured sheet

PREFERRED EMBODIMENT

A. Resin Composition

Necessary components of said resin composition of the present invention are aqueous solution of phenolic resin and epoxy compound which is dispersed or dissolved in said phenolic resin.

[Phenolic resin]

Phenolic resin is produced by condensation reaction between phenolic compound and aldehyde and/or aldehyde donor. In the case of water soluble phenolic resin, sulfoalkylated and/or sulfialkylated phenolic resin is desirably used to improve stability. Not only said phonolic resin but, for instance, novolak resin produced by condensation reaction between cresol including m-cresol and p-cresol and carbonyl compound and the like (TOKKAI Hei 11-322874) is also used as water soluble phenolic resin besides said phenolic resin in the present invention.

(Phenolic compound)

Phenolic compound used to produce said phenolic resin may be monohydric phenol or polyhydric phenol or a mixture of monohydric phenol and polyhydric phenol, but in a case where only monohydric phenol is used, formaldehyde is apt to be emitted when or after said resin composition is cured so that polyphenol or a mixture of monophenol and polyphenol is desirably used.

(Monohydric Phenol)

The monohydric phenols include alkyl phenols such as o-cresol, m-cresol, p-cresol, ethylphenol, isopropylphenol, xylenol, 3,5-xylenol, butylphenol, t-butylphenol, nonylphenol and the like; monohydric derivatives such as o-fluorophenol, m-fluorophenol, p-fluorophenol, o-chlorophenol, m-chlorophenol, p-chlorophenol, o-bromophenol, m-bromophenol, p-bromophenol, o-iodophenol, m-iodophenol, p-iodophenol, o-aminophenol, m-aminophenol, p-aminophenol, o-nitrophenol, m-nitrophenol, p-nitorophenol, 2,4-dinitorophenol, 2,4,6-trinitorophenol and the like; monohydric phenols of polycyclic aromatic compounds such as naphthol and the like. Each monohydric phenol can be used singly or used as a mixture thereof.

(Polyhydric Phenol)

The polyhydric phenols mentioned above, include resorsin, alkylresorsin, pyrogallol, catechol, alkyl catechol, hydroquinone, alkyl hydroquinone, fluoroglrsin, bisphenol, dihydroxynaphthalene and the like. Each polyhydric phenol can be used singly of used as a mixture thereof. Resorsin and alkylresorsin are more suitable than other polyhydric phenols. The alkylresorsin is the most suitable polyhydric phenols in particular because the alkylresorsin can react with aldehydes rapidly than the resorsin. The alkylresorsins include 5-methyl resorsin, 5-ethyl resorsin, 5-propyl resorsin, 5-n-butyl resorsin, 4,5-dimethyl resorsin, 2,5-dimethyl resorsin, 4,5-diethyl resorsin, 2,5-diethyl resorsin, 4,5-dipropyl resorsin, 2,5-dipropyl resorsin, 4-methyl-5-ethyl resorsin, 2-methyl-5-ethyl resorsin, 2-methyl-5-propyl resorsin, 2,4,5-trimethyl resorsin, 2,4,5-triethyl resorsin, and the like.

Polyhydric phenol mixture produced by dry distillation of oil shale produced in Estonia is inexpensive and said polyhydric phenol mixture includes 5-metylresorcin and many kinds of alkylresorcin having a high reactivity so that said polyhydric phenol mixture is a specially desirable polyphenol raw material.

In the present invention, said phenolic compound and aldehyde and/or aldehyde donor (aldehydes) are condensated together. Said aldehyde donor means a compound or a mixture which emits aldehyde when said compound or said mixture decomposes. The aldehydes include formaldehyde, acetoaldehyde, propionaldehyde, chloral, furfural, glyoxal, n-butylaldehyde, caproaldehyde, allylaldehyde, benzaldehyde, crotonaldehyde, acrolein, phenyl acetoaldehyde, o-tolualdehyde, salicylaldehyde and the like. The aldehyde donors include paraformaldehyde, tiroxane, hexamethylenetetramine, tetraoxymethylene and the like.

As above described, said phenolic resin is desirably sulfoalkylated and/or sulfialkylated to improve the stability of said water soluble phenolic resin.

(Sulfoalkylation Agent)

The sulfoalkylation agents for use to improve stability of aqueous solution of phenol resins, include water soluble sulfites prepared by reaction of sulfurous acid, bisulfurous acid, or metabisulfirous acid and alkaline metals, trimethyl amine, quaternary ammonium (e.g. benzyltrimethylammonium); aldehyde additions prepared by reaction of water soluble sulfites and aldehydes.

The aldehyde additions are prepared by addition reaction of aldehydes and water soluble sulfites mentioned above, wherein the aldehydes include formaldehyde, acetoaldehyde, propionaldehyde, chloral, furfural, glyoxal, n-butylaldehyde, caproaldehyde, allylaldehyde, benzaldehyde, crotonaldehyde, acrolein, phenyl acetoaldehyde, o-tolualdehyde, salicylaldehyde and the like. For example, hydroxymethane sulfonate, which is one of the aldehyde additions, is prepared by addition reaction of formaldehyde and sulfite.

(Sulfialkylation Agent)

The sulfialkylation agents for use to improve stability of aqueous solution of phenol resins, include alkaline metal sulfoxylates of aliphatic or aromatic aldehyde such as sodium formaldehyde sulfoxylate (a.k.a. Rongalit), sodium benzaldehyde sulfoxylate and the like; hydrosulfites (a.k.a. dithionites) of alkaline metal or alkaline earth metal such as sodium hydrosulfite, magnesium hydrosulfite and the like; hydroxyalkanesulfinate such as hydroxymethanesulfinate and the like.

(Additive)

In the case of producing the phenol resins, if necessary, additives may be mixed with the phenol resins as a catalyst or to adjust pH, wherein additives include acidic compounds and alkaline compounds. Acidic compounds include inorganic acid or organic acid such as hydrochloric acid, sulfuric acid, orthophosphoric acid, boric acid, oxalic acid, formic acid, acetic acid, butyric acid, benzenesulfonic acid, phenolsulfonic acid, p-toluenesulfonic acid, naphthalene-$\alpha$-sulfonic acid, naphthalene-$\beta$-sulfonic acid and the like; esters of organic acid such as dimethyl oxalate and the like; acid anhydrides such as phthalic anhydride, maleic anhydride and the like; salts of ammonium such as ammonium chloride, ammonium sulfate, ammonium nitrate, ammonium oxalate, ammonium acetate, ammonium phosphate, ammonium thiocyanate, ammonium imidosulfonate and the like; halogenated organic compounds such as monochloroacetic acid, salt thereof, $\alpha,\alpha'$-dichlorohydrin and the like; hydrochloride of amines such as triethanolamine hydrochloride, aniline hydrochloride and the like; urea adducts such as urea adduct of salicylic acid, urea adduct of stearic acid, urea adduct of heptanoic acid and the like; N-trimethyl taurine, zinc chloride, ferric chloride and the like.

Alkaline compounds include ammonia, amines; hydroxides of alkaline metal and alkaline earth metal such as sodium hydroxide, potassium hydroxide, barium hydroxide, calcium hydroxide and the like; oxide of alkaline earth metal such as lime and the like; salts of alkaline metal such as sodium carbonate, sodium sulfite, sodium acetate, sodium phosphate and the like.

(Method of Producing the Phenol Resins)

The phenol resins (the precondensation polymers) can be prepared by usual method. The usual method includes method (a) comprising condensation of a monohydric phenol and/or a polyhydric phenol and the aldehydes; method (b) comprising condensation of a precondensation polymer and a monohydric phenol and/or a polyhyrdric phenol, wherein the precondensation polymer comprises a monohydric phenol and aldehydes; method (c) comprising condensation of a precondensation polymer and a monohydric phenol and/or a polyhydric phenol, wherein the precondensation polymer comprises a monohydric phenol, a polyhydric phenol and aldehydes; method (d) comprising condensation of a precondensation polymer consisting of the monohydric phenol and the aldehydes, and the precondensation polymer consisting of the polyhydric phenol and the aldehydes; method (e) comprising condensation of the precondensation polymer consisting of the monohydric phenol and the aldehydes and/or the precondensation polymers consisting of the polyhydric phenol resin and the aldehydes, and the precondensation polymer consisting of the monohydric phenol and the polyhydric phenol and the aldehydes.

In the case of the method (a) of the condensation of the monohydric phenol and/or the polyhydric phenol and the aldehydes, the aldehydes (0.2 mole to 3 moles) are added to the monohydric phenol (1 mole), and the aldehydes (0.1 mole to 0.8 mole) are added to the polyhydric phenol (1 mole) in usual. If necessary, additives may be added to the phenol resins (the precondensation polymers). In the method (a), the condensation is reacted by heating at 55° C. to 100° C. for 8 hrs to 20 hrs. Addition of the aldehydes may be done at one time at the beginning of the reaction, or several times during the reaction. The acid compounds or alkaline compounds mentioned above are used as a catalyst of the condensation reaction. The novolak type phenol resins are the suitable resins in this invention so that the acid compounds are used as the catalyst. The novolak type phenol resins have little formaldehyde and good reactivity with the epoxy compounds.

In the case of sulfomethylation and/or sulfimethylation, the sulfomethylation agents and/or sulfimethylation agents may be added to the precondensation on a suitable occasion.

Addition of the sulfomethylation agents and/or sulfimethylation agents may be done any time such as before the beginning of the condensation, during the condensation or after the condensation.

Total addition amount of said sulfoalkylation agent and/or sulfialkylation agent is usually in the range between 0.001 to 1.5 moles for 1 mole of phenol. In a case where said addition amount is less than 0.001 mole, hydrophile of the resulting sulfoalkylated and/or sulfialkylated phenolic resin is not enough and in a case where said addition amount is more than 1.5 moles, water resistance of the resulting sulfoalkylated and/or sulfialkylated phenolic resin becomes inferior. To provide excellent using property of the resulting precondensate and excellent physical properties of the cured resin, said addition amount is preferably in the range between 0.01 to 0.8 mole for 1 mole of phenol.

The sulfomethylation agents and/or sulfimathylation agents for sulfomathylation and/or sulfimethylation react with the methylol groups and/or aromatic groups so that the sulfomethyl group and/or sulfimethyl group are introduced to the precondensation prepolymers.

The solution of precondensation polymers of sulfoalkylated and/or sulfialkylated phenol resins is stable widely even if acid condition (e.g. pH=1.0) or alkaline condition so that the solution can be cured in any conditions such as acid, neutral or alkaline condition. In the case of curing the precondensation under the acid condition, there is a decrease of remained methylol groups so that no formaldehydes from decomposed cured phenol resins occur.

Even if in the case of use of an insoluble epoxy compounds, this invention has an advantage of getting a stable epoxy compounds dispersion to mix the epoxy compounds with a solution of precondensation polymers of sulufomethylated and/or sulufimethylated phenol resins. Therefore the insoluble epoxy compounds can be dispersed in the solution easily.

Further, if necessary, the phenol resins and/or precpndensation polymers thereof may be copolycondensated by amino resin monomers such as urea, thiourea, melamine, thiomelamine, dicyandiamine, guanidine, guanamine, acetoguanamine, benzoguanamine, 2,6-diamino-1.3-diamine and the like.

[Epoxy Compound]

Epoxy compounds for use in this invention have at least two epoxy groups. The epoxy compounds include poly epoxy compounds such as diethylene glycol diglycidyl ether, polyethylene glycol diglycidyl ether, tripropylene glycol diglycidyl ether, polypropylene glycol diglycidyl ether, glycerine polyglycidyl ether, polyglycerine polyglycidyl ether, neopentyl grycol diglycidyl ether, 1,6-hexanediol diglycidyl ether, trimethylol propane polyglycidyl ether, glycidyl hexahydrophthalate, epoxy compounds modified fatty acid and the like; epoxy resins such as epoxy resins of bisphenol A, epoxy resins of tetrabromobisphenol A, epoxy resins of bisphenol F. epoxy resins of bisphenol S, epoxy resins of bisphenol B, epoxy resins of naphthalene, epoxy resins of novolak resin, epoxy resins having fluorene structures, epoxy resins comprising copolymer of phenol compounds and dicyclopentadiene, epoxy resins of diglycidyl resorcinol, epoxy resins of glycidyl ether, epoxy resins of glycidyl amine and the like; epoxy derivatives prepared by reacting epichlorohydrin and the polyhydric phenol mentioned above or bisphenol(e.g. bisphenol A, bisphenol F) and the like. The epoxy compounds epoxy resins epoxy derivatives can use singly, or in combination with each other.

Epoxy derivatives have good reactivity with phenol resins so that epoxy resins are the most suitable for use in this invention. Among of all epoxy derivatives, the epoxy derivatives of polyhydric phenols (e.g. resorsin, alkyl resorsin, shale oil resorsin) can react with the phenol resins well in particular.

Said epoxy compound is desirably soluble or dispersible in water considering easiness of dissolving or dispersing in aqueous solution of phenolic resin or considering uniformity of mixture of said epoxy compound and said aqueous solution of phenolic resin and said epoxy compound is desirably dispersed or emulsified in water by using suitable emulsifier and then mixed in said aqueous solution of phenolic resin. However even water-insoluble epoxy compound can be dispersed and emulsified in said aqueous solution of phenol resin in which emulsifier is dissolved as it is or by dissolving in organic solvent. In a case where said phenolic resin is sulfoalkylated and/or sulfialkylated, even said epoxy compound is water-insoluble, said epoxy compound can be dispersed and emulsified in said aqueous solution of phenolic resin without using emulsifier since said sulfoalkylated and/or sulfialkylated phenolic resin acts as a dispersing agent. Further, when epoxy resin is used as said epoxy compound, said resin composition of the present invention gives a cured resin having a high strength. In this case when said epoxy resin have aromatic hydrocarbon radical, said aromatic hydrocarbon radical may be partially or wholly sulfoalkylated and/or sulfialkylated in the same manner as said phenolic resin, improving hydrophilicity. In this case, sulfoalkylating agent and/or sulfialkylating agent is(are) added to epoxy resin monomer such as bisphenol in an amount of 0.001 to 1.5 mol, desirably 0.01 to 0.8 mol for epoxy resin monomer. In a case where said sulfoalkylating agent and/or sulfialkylating agent is added in an amount less than 0.001 mol for epoxy resin monomer, hydrophile of said epoxy resin may not be enough but in a case where said sulfoalkylating agent and/or sulfialkylating agent is added in an amount of bigger than 1.5, water resistance may decrease.

One or more kind(s) of mono epoxy compound may be added to said epoxy compound to improve flexibility or as reactive diluting agent. Said mono epoxy compound is such as higher alcohol glycidyl ether, butyl glycidyl ether, phenyl glycidyl ether, cresyl glycidyl ether, nonylphenyl glycidyl ether, glycidyl methacrylate and the like.

[Resin Composition]

Said resin composition of the present invention contains said water-soluble phenolic resin and said epoxy compound and in said resin compound, said epoxy compound acts as a curing agent of said phenolic resin. Accordingly, it is not necessary to use formaldehyde or formaldehyde donor such as hexamethylenetetramine as curing agent of said phenolic resin so that said resin composition contains little amount of free formaldehyde when or after said resin composition is cured, as the result, said resin composition has no problem about the contamination of environment. Further since said epoxy compound reacts with free phenol contained in said resin composition, as the result said resin composition contains little amount of free phenol to prevent generation of a bad smell from free phonol.

Adding amount of said epoxy compound to said phenolic resin is desirably 2 to 150 parts by weight, more desirably 5 to 100 parts by weight for 100 parts by weight of said phenolic resin. When adding amount of said epoxy compound is less than 2 parts by weight, curing of said phenolic resin is not enough and when adding amount of said epoxy compound is more than 150 parts by weight, the amount of epoxy compound which is not combined with said phenolic resin increases to have bad influence upon strength.

Usually said resin composition is provided as an aqueous solution of precondensate. If necessary, epoxy resin curing agents including amines such as aliphatic amines (e.g. ethylenediamine, diethylene triamine, triethylene tetramine, dipropylene triamine, dimethylaminopropylamine, diethylaminopropylamine, cyclohexylaminopropylamine, monoethanolamine, diethanolamine, propanolamine, N-methylethanolamine, aminoethyletanolamine and the like); aromatic amines (methanephenylenediamine, P,P'-diaminodiphenylmethane, diaminodiphenyl sulfone, benzyldimethylamine, a-methyldimethylamine, dimethylaminomethylphenol, tridimethylaminomethylbenzene, and the like); acid anhydrides (e.g. phthalic anhydride, hexahydrophthalic anhydride, dodecylsuccinic anhydride, pyromellitic dianhydride, croleintic anhydride and the like) may be added to the phenol resins or epoxy compounds.

Further aldehydes such as formaldehyde, acetoaldehyde, propionaldehyde, chloral, furfural, glyoxal, n-butylaldehyde, caproaldehyde, allylaldehyde, benzaldehyde, crotonaldehyde, acrolein, phenyl acetoaldehyde, o-tolualdehyde, salicylaldehyde and the like; aldehyde donors such as paraformaldehyde, tiroxane, hexamethylenetetramine, tetraoxymethylene and the like; amino resins such as urea resins, melamine resins and the like; natural rubbers, derivatives thereof; synthetic rubbers such as styrene/butadiene rubber, acrylonitrile/butadiene rubber, chloroprene rubber, ethylene/propylene rubber, isoprene rubber, isoprene/isobutylene rubber and the like; vinyl hompolymers or vinyl copolymers such as vinyl acetate, vinyl propionate, styrene, acrylate, metacrylate, acrylonitrile, acrylic acid, methacrylic acid, maleic acid, vinyl chloride, vinylidene chloride, vinylpyridine and the like; emulsions, latices, aqueous or solutions of polyurethane, polyamide, butyral resin, polyethylene, polypropylene, vinyl acetate/ethylene copolymer, chlorinated polyethylene, chlorinated polypropylene, polyester and the like; water soluble polymers or natural gums such as polyvinyl alcohol, sodium alginate, starch, starch derivatives, glue, gelatin, blood powder, methylcellulose, carboxymethylcellulose, hydroxymethylcellulose, polyacrylic acid, polyacrylic amide and the like; fillers such as calcium carbonate, talc, gypsum, carbon black, wood powder, walnut powder, coconut powder, wheat flour, rice flour and the like; surface active agent; higher fatty acids such as stearic acid, palmitin acid and the like; higher alcohols such as palmityl alcohol, stearyl alcohol and the like; ester of fatty acid such as butylstearate, glycerin monosteatate and the like; amides of fatty acid; natural wax such as carnauba wax and the like; synthetic wax; release agents such as paraffin, paraffin oil, silicone oil, silicone resin, fluororesin, polyvinylalcohol, grease and the like; low boiling point solvents such as hexane, butane, n-pentane, alcohol, ether, methylene chloride, tetrachloromethane, chlorofluoromethane, 1,1,2-trichloro-1,2,2-trifluoroethane and the like; organic foaming agents such as azodicarbonamide, dinitorosopentamethylenetetramine, P,P'-oxybis(benzensulfonyl hydrazide, azobis-2,2'-(2-methyl glopio nitorile) and the like; inorganic foaming agents such as sodium bicarbonate, potassium bicarbonate, ammonium bicarbonate and the like; microcapsule foaming agents consisting of a thermoplastic resin capsule in which include a gas such as n-pentane, isopentane, butane, isobutene and the like; porous particles such as silas balloon, paerlite, glass balloon, foamed glass, porous ceramics and the like, plastic foam and powder thereof such as polyethylene foam, polystyrene foam, polypropylene foam; pigment, dye, fire retardant, water repellent, oil repellent, insect repellent(insecticide), antiseptic, antioxidant, ultraviolet absorber; plasticizers such as phthalate(e.g. dibutyl phthalate(DBP), dioctyl phthalate (DOP), dicyclohexylphthalate), tricresyl phosphate and the like may be added to the phenol resins and/or epoxy compounds.

In curing reaction of said resin composition of the present invention, phonolic hydroxy group of said phenlic resin reacts with epoxy groups besides said reaction, the reaction between aromatic hydrocarbon radical of said phenolic resin and aromatic hydrocarbon radical of said epoxy compound to produce methylene bond also takes place in a case where said resin composition contains formaldehyde or phenol component in said phenolic resin has methylol group.

Said resin composition above mentioned has various use such as an impregnating agent for porous material such as fiber sheets, foamed plastic sheets and the like to give said porous material rigidity and moldability, a binder for wood flake, fiber material and the like, paint, adhesive, and the like.

B. Molding Material

Said resin composition of the present invention is impregnated in porous material as an impregnating agent or mixed in chip, powder, or fiber as a binder. Said porous material (molding material (1)) impregnating said resin composition of the present invention, and said chip, powder or fiber in which said resin composition is mixed (molding material (2)) have moldability so that they are useful as molding material.

[Porous Material]

Porous materials for use in this invention include fiber members, plastic foam and sintered plastic beads.

The fiber members include natural fiber such as cotton, hemp, wool, silk, kenaf, coconut fiber, bamboo fiber and the like; organic synthetic fibers such as polyamide fiber, polyester fiber, acrylic fiber, viscose fiber, acetate fiber, vinyl chloride, vinylidene chloride and the like, inorganic fibers such as asbestos fiber, glass fiber, carbon fiber, ceramics fiber, metal fiber, whisker, rock wool and the like; recycled fibers prepared by untying waste articles made of the fiber members, mixed fiber thereof. Fiber member may be mixed with thermoplastic fiber having a melting point under 200° C. such as polyester fiber, polypropylene fiber, polyethylene fiber, polyamide fiber and the like. The fiber members have a variety of style such as web, nonwoven fabric, felt, knitted items, textile, laminates thereof, and the like.

Plastic foams, which are interconnecting foam, include polyurethane; polyolefin foam such as polyethylene, polypropylene; polyvinyl chloride foam, polystyrene foam; amino resin foams such as melamine foam, urea foam; phenol resin foam, and the like. Plastic foams are prepared as plastic green sheets for use in automobiles' interior member.

[Manufacturing of Molding Material (1)]

The molding material (1) of the present invention can be manufactured by impregnating said resin composition of the present invention in said porous material and drying by heating at a temperature lower than curing temperature of said resin composition.

Many well-known methods such as a dipping method, spray method, and the like can be applied to impregnate said resin composition in said porous material. In the case of said dipping method, for instance, said porous material is dipped in a dipping tank in which said resin composition is filled and then said porous material to which said resin composition adheres is pressed by a wringing roller or press plate or the like to impregnate a desirable amount of said resin composition in said porous material. Further said resin composition may be mechanically or chemically foamed.

Said porous material in which said resin composition is impregnated is then dried by heating and in said heating and drying process, said phenolic resin precondensate contained in said resin composition may be put in B-stage. To keep said precondensate in B-stage, heating temperature, time and so on are conveniently adjusted and heating temperature is settled below curing temperature of said resin composition, usually in the range between 50 and 180° C., and heating time is settled in the range between 0.1 and 5 hours. Usually hot air heating, far infrared radiation heating, high frequency heating are applied for said heating and drying process.

As above described, phenol resin precondensate in said resin composition impregnated in said porous material is put in B-stage and in this case, the stability of said resin composition is improved and the resulting molding material can be stored for a long time while molding time is shortened since water content of said resin composition decreases, and puncture phenomenon by vapor is avoided when said molding material is molded by hot pressing. Further, after said molding material is molded by hot-pressing, since said resin composition is completely cured, a molded article having an excellent dimension stability and heat resistance is obtained.

[Molding/Molding Article]

Since phenolic resin and epoxy resin which are thermosetting resins respectively, are impregnated in said molding material (1) of the present invention, said molding material (1) has moldability and is usually molded by hot-pressing using a molding machine having a lower mold part and an upper mold part whose mold faces have desirable shapes respectively. About the condition of said hot-pressing, press temperature and press time are respectively settled so that said resin composition is completely cured and press pressure is usually settled in the range between 1 and 10 kg/cm$^2$. In this case, a sheet can be put on said molding material when said molding material is hot-pressed to be a laminated molding article.

Since said resin composition impregnated in said molding material does not use formaldehyde and formaldehyde donor such as hexamethylenetetramine as a curing agent, formaldehyde is not emitted when or after said resin composition is cured so that said molding material does not contaminate environment.

Said molded article made from said molding material (1) is useful especially as interior of a car such as door trim, a dash board, head lining, insulator hood, dash inner, dash outer, engine under cover, trunk side trim and the like or base member or surface member of said interior or building material such as floor panel, wall panel, base panel of roof and the like.

When said molded article is used as surface member, wadding member such as foamed plastic, non-woven fabric and the like may be laminated or the back side of said surface member and said base member on which said surface member is attached is such as plastic foams (e.g. polyurethane foam, polyolefin foams such as polyethylene foam, polypropylene foam, polyvinyl chloride, polystyrene foam, melamine resin foam, urea resin foam); corrugated cardboard, resin felt, plywood, particleboard, woody cement board and the like.

Figure 1:
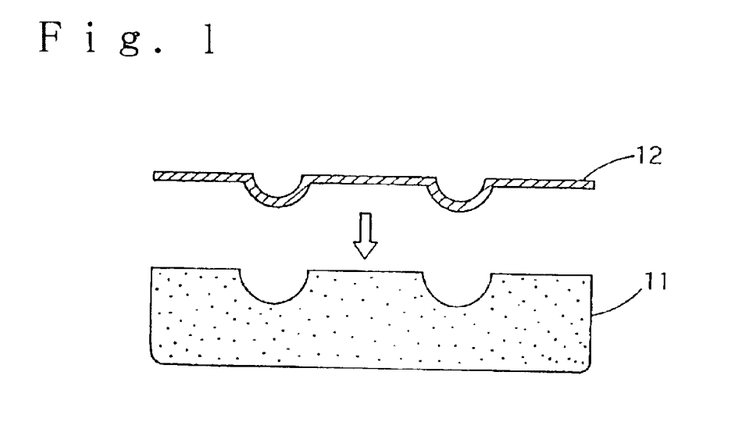
FIG. 1 is to illustrate a process to manufacture a molded article.

In a case where said molded article is used as a surface member, said surface member is attached on said base member by three methods described below. The first method is one consisting of molding said base member (11) into an estimated shape and further molding sheet type molding material (1) into a shape corresponding with that of said base member (11), then attaching said molded cured sheet (12) to the surface of said base member (11).

To attach said cured sheet (12) to the surface of said base member (11), adhesive described below, hot-melt type adhesive, or a hot-melt sheet is used and in a case where said base member (11) is made of thermoplastic material, said cured sheet (12) is attached by melting the surface of said base member (11) by heating.

Figure 2:
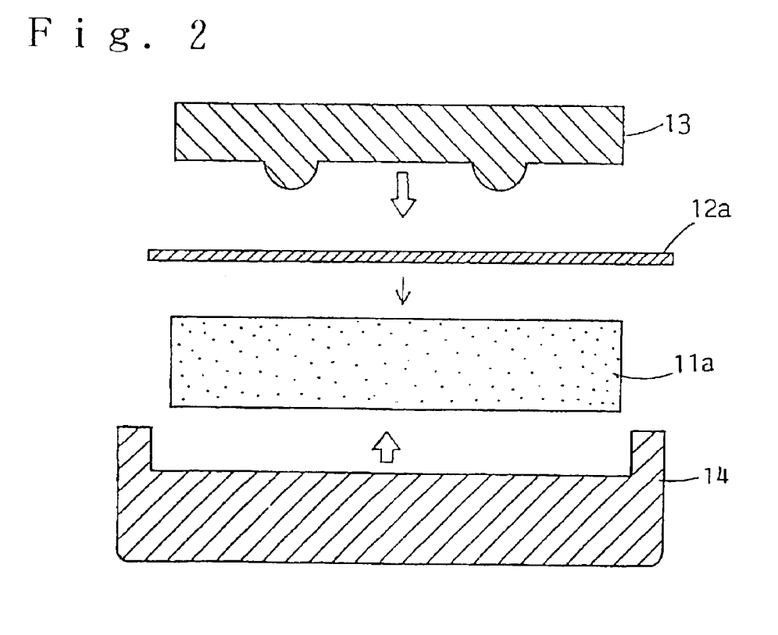
FIG. 2 is to illustrate a process to manufacture a molded article.
Figure 3:
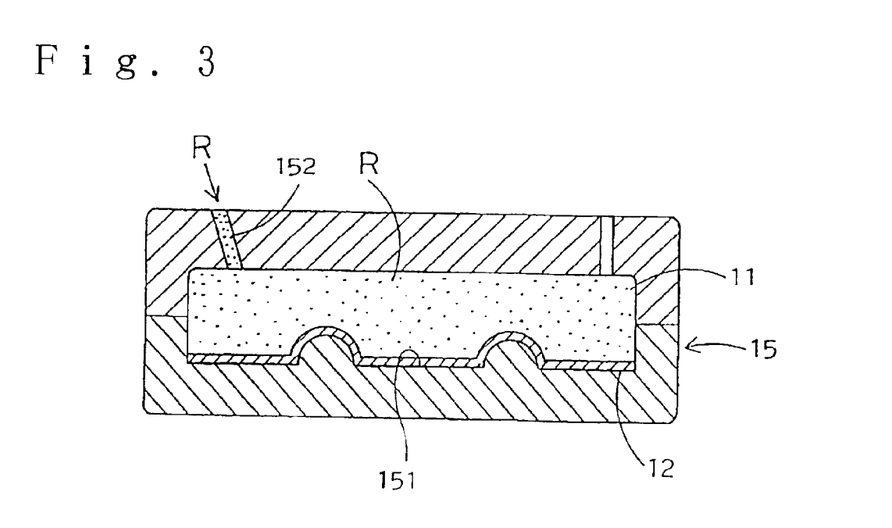
FIG. 3 is to illustrate a process to manufacture a molded article.

The second method is one consisting of putting said sheet type molding material (12a) on unmolded base member (11a) and molding said sheet type molding material (12a) and said unmolded base member (11a) together by hot-pressing using the upper mold part (13) and the lower mold part (14) whose mold faces have desirable shapes respectively to cure said resin composition in said molding material (12a) as shown in FIG. 2. In this case, a hot melt sheet or adhesive such as natural resin, natural rubber, synthetic resin, synthetic rubber and the like can be put between said molding material (12a) and said unmolded base member (11a) according to material of said base member. The third method is one consisting of molding and curing said sheet type molding material in an estimated shape, setting said molded and cured sheet type molding material (12) on the mold face (151) of a mold (15), injecting foamable liquid resin R through an aperture 152 in said mold (15), and foaming and curing said foamable liquid resin R to form a base as shown in FIG. 3.

Said foamable liquid resin R includes such as polyurethane resin, polyolefin resin such as polyethylene, polypropylene, and the like, foamable polyvinyl chloride resin, foamable polystyrene resin, foamable melamine resin, foamable urea resin, and the like, further said resin composition of the present invention.

Since said resin composition which does not contain formaldehyde and formaldehyde donor such as hexamethylenetetramine and the like is impregnated and cured in said surface member of the present invention, said molding material does not emit formaldehyde, not to contaminate environment.

Further since said surface member has a high rigidity, the resulting interior has a good dimension stability to keep the molded shape for a long time.

In a case where said molded article is used as the base member of the interior, usually the surface member is attached on the surface of said base member.

The surface members include artificial hides, leathers, knitted items, textiles, nonwoven fabrics, laminate thereof. The laminate may be laminated with plastics foams such as polyurethane foam, polyethylene foam, polypropylene foam, polystyrene foam, polyvinylchloride foam and the like.

The surface member is pasted on the base member by adhesives, hot melt adhesives, hot melt sheets and the like.

The adhesives include acrylic adhesives, synthetic adhesives, elastomer adhesives, vinyl acetate adhesives, vinyl chloride adhesives, urea resin adhesives, melamine resin adhesives, epoxy resin adhesives, and adhesives for use in this resin composition. In this invention, the resin composition can use for an adhesive.

In the case of forming products, the surface member containing a condensation pre-polymer of thermosetting resins being B-stage may be laminated with the base member so that the surface member can adhere to the base member.

Also the adhesives may coat the surface member impregnated with the thermosetting resin in order to use the adhesives and the thermosetting resin at the same time.

The hot melt adhesives include polyolefin resins such as polyethylene, polypropylene, ethylene/vinyl acetate copolymer, ethylene/ethylacrylate copolymer, modified polyolefin resins, polyurethane resin, polyester resin, polyamide resin, mixtures thereof.

The hot melt adhesives may be prepared as a solution, an emalsion or a dispersion made of the hot melt adhesive powder dispersed in water. Further the hot melt adhesives may use for a sticker.

In a case where said adhesive is coated to form an adhesive layer, according to circumstances, said adhesive layer is desirably dotted on the attaching face of said base member. As above described, in a case where said surface member and said base member are attached together by said dotted adhesive layer, the rigidity of said adhesive layer does not effect the molded shape of the resulting interior and the embossing shape of the surface of the resulting interior, and accordingly the molded shape of said interior and the embossing shape of the surface of said interior are sharply formed. Further, in a case where said surface member has gas permeability, since said dotted adhesive layer also has gas permeability, an interior having an excellent soundproof property is obtained.

To form said dotted adhesive layer on the adhesive face of said surface member, and/or said base member, for instance, a spray coating method, relief printing method, silk screen printing method and the like are applied and further a method consisting of covering a masking sheet on the adhesive surface; coating the adhesive with such as a spray, knife coater, roll coater, flow coater and the like, and peeling said masking member from said adhesive surface also can be applied.

A desirable method to form said dotted adhesive layer on said adhesive surface is a spray coating method using a dispersion of a hot melt adhesive powder Said surface member is attached on the surface of said base member by said adhesive layer and in the case of solution or emulsion type adhesive, said surface member and said base member are attached together before said adhesive layer is completely dried. Further, in the case of hot-melt adhesive, said adhesive layer on the adhesive face is heated to soften said adhesive layer and then said surface member and said base member are attached together.

Molding of said base member may be carried out when or after said surface member is attached on said base member.

In a case where said surface member has gas permeability and molding is carried out after said surface member is attached on said base member, since the air contained in said base member is smoothly discharged from said surface member through said dotted adhesive layer during molding no puncture phenomenon of the resulting interior occurs. Since said base member of the interior made of said molding material (1) of the present invention contains said resin composition in which formaldehyde or formaldehyde donor such as hexamethylenetetramine and the like as a curing agent is not impregnated, the resulting interior does not emit formaldehyde not to contaminate the environment. The resulting interior using said molding material (1) as said base material has a high rigidity and has various kinds of use such as the interior of the trunk room and the dash board, and the like of a car. In said interior, especially in a case where said surface member and said base member are attached together by said dotted adhesive layer, the rigidity of said adhesive layer does not effect molding shape of said interior or embossing shape of the surface of said interior so that said molding shape of said interior and embossing shape of the surface of said interior become sharp. Further in a case where said surface member has gas permeability, since said dotted adhesive layer also has gas permeability, the resulting interior has an excellent soundproof property.

[Chip/Powder/Fiber]

The chip used as said molding material (2) of the present invention includes mainly such as wood flake, saw dust, wood fiber bundle and the like and besides said wood materials, plastic chip, foamed plastic chip and the like can be used as said chip of the present invention. The powder used as said molding material (2) of the present invention includes wood powder, plastic powder, and the like.

The fiber used as said molding material (2) of the present invention includes natural fiber, organic fiber, inorganic fiber, reclaimed fiber and wood fiber such as wood pulp. Two or more kinds of said chip, powder, fiber may be mixed together to use as said molding material (2) of the present invention.

[Preparation of Said Molding Material (2)]

Said molding material (2) of the present invention is prepared by a method wherein said chip and/or powder and/or fiber is(are) dipped in said resin composition of the present invention or a method wherein said resin composition is added with a spray and the like in said chip and/or powder and/or fiber by stirring and if desired, the resulting mixture is dried by heating at a temperature below the curing temperature of said resin composition. In this case, said phenolic resin in said resin composition may be in B-stage the same as said molding material (1).

[Molding/Molded Article]

After drying or without drying, said molding material (2) of the present invention is strewed on the lower mold having a desirable shaped mold face of the press machine to form a mat and then said mat is hot-pressed. Conditions of said hot-press are the same as the conditions in the case of said molding material (1) and a sheet may be put on said mat to hot-press to manufacture a laminated molding article.

Since said molding material (2) contains said resin composition which dose not use formaldehyde or formaldehyde donor such as hexamethylenetetramine and the like as a curing agent, said molding material (2) also does not emit formaldehyde when or after said molding material is cured, not to contaminate the environment.

The molded article made of said molding material (2) of the present invention is useful as the interior as the base member of the interior the same as said molding material (1) or building material such as a floor panel, wall panel, base panel of a roof and the like. Said resin composition is also useful as adhesive, vehicle of paint besides said molding material. Further said molding material is used as pad member of the sheet or the mat and the like besides the interior or the building materials.

[Action]

When epoxy compound is mixed in phenolic resin, OH group of said phenolic resin and epoxy group of said epoxy resin react together to form a three dimensional structure below described and as the result, said resin composition is cured.

(Chemical Formula 1)

Phenolic OH has a tendency to dissociate as follows (Chemical Formula 2)

So that said curing reaction can be carried out at a low temperature and especially in the case of novalak type phenolic resin said reaction can be smoothly and swiftly carried out. In said curing reaction, formaldehyde or formaldehyde donor is not used as a curing agent, the content of free phenol in said phenolic resin also decreases. Further, since the phenol contained in phenolic resin reacts with the epoxy group in epoxy compound in the same manner as described above, the content of free phenol in said resin also decreases.

EXAMPLE 1

An aqueous dispersion of bisphenol A type epoxy resin (50% by weight) (B) using a surface active agent as a dispersing agent was added in 100 parts by weight (hereafter to be described as "Part(s)") of 50% by weight of aqueous solution of sulfomethylated alkylresorcine—formaldehyde precondensate (A) to prepare samples 1 to 6. Adding weight ratio of said aqueous dispersion (B) for each sample is shown in Table 1. A film was formed by using each sample and said film was cured at 180° C. for 2 minutes and free formaldehyde was detected and the result is shown is in Table 1.

Comparison 1

Novolak type phenolic resin powder (a) in which 5% by weight of hexamethylenetetramine was mixed was cured in the same manner as in EXAMPLE at 180° C. for 2 minutes and free formaldehyde was detected and the result is also shown in Table 1.

TABLE 1

|  |  | 1 | 2 | 3 | 4 | 5 | 6 |
|---|---|---|---|---|---|---|---|
| the ratio of mixtures (parts by weight) | (A) | 100 | 100 | 100 | 100 | 100 | — |
|  | (B) | 2 | 10 | 50 | 80 | 100 | — |
|  | (a) | — | — | — | — | — | 100 |
| free formaldehyde ($\mu$g/g) |  | 0.15 | <0.002 | <0.002 | <0.002 | <0.002 | 5.0 |

Referring to Table 1, it is recognized that free formaldehyde content of said resin composition of the present invention is much smaller than that of the the traditional phenolic resin.

EXAMPLE 2

PH of 50% by weight of aqueous solution of sulfimethylated orcinol-phenol formaldehyde precordensate was adjusted by hydrochloric acid and sodium hydroxide as shown in Table 2.

An aqueous solution of glycidylether type water soluble epoxy resin (50% by weight)(C) and bisphenol F type water soluble epoxy resin (98% by weight) (D) were mixed in said aqueous solution whose pH was adjusted as above described without using the surface active agent wherein 50 parts of said epoxy resin (C) as solid and 50 parts of said epoxy resign (D) as solid were added in 100 parts of each precondensate sample as solid and compatibilities of the resulting mixtures were determined and the results are sown in Table2.

TABLE 2

| pH (resin) | solubility | |
|---|---|---|
|  | C | D |
| 10.2 | ⊚ | ○ |
| 8.3 | ⊚ | ○ |
| 7.1 | ⊚ | ○ |
| 5.4 | ⊚ | ○ |
| 3.2 | ⊚ | ○ |
| 1.3 | ⊚ | ○ |

⊚: Completely compatible, Good stability
○: Uniformly dispersing, Good stability

Comparison 2

Unsulfomethylated orcinol-phenol-formaldehyde pre-co-condensate was used and mixed in the same manner as in EXAMPLE 2 and the result was shown in Table 3. Referring to Table 3, in the case of unsulfomethylated orcinol-phenol-formaldehyde pre-co-condensate, water insoluble epoxy resin can not be stably dispersed in water without using the surface active agent and even in a case where water soluble epoxy resin is used, the resulting dispersion becomes unstable especially in a case where PH value is low.

TABLE 3

| pH (resin) | solubility | |
|---|---|---|
|  | C | D |
| 10.2 | Δ | x |
| 8.3 | Δ | x |
| 7.1 | Δ | x |

TABLE 3-continued

| pH (resin) | solubility | |
|---|---|---|
|  | C | D |
| 5.4 | Δ | x |
| 3.2 | x | x x |
| 1.3 | x | x x |

Δ: Can be mixed but unstable
x: Can be mixed but separate immediately
x x: Incompatible, Can not be mixed

EXAMPLE 3

Free formaldehyde of the film of the mixture of the water soluble epoxy resin (c) in EXAMPLE 2, said film being cured at 200° C. for 60 seconds was detected and the result was shown in Table 4. As shown in Table 4, small amount of free formaldehyde was detected.

TABLE 4

| pH (resin) | free formaldehyde (µg/g) |
| --- | --- |
| 10.2 | <0.005 |
| 8.3 | <0.002 |
| 7.1 | <0.002 |
| 5.4 | <0.002 |
| 3.2 | <0.002 |
| 1.3 | 0.003 |

EXAMPLE 4

Forty-five parts of 60% by weight of aqueous solution of glycidylamine type water soluble epoxy resin, 5 parts of flame retardant, and 7 parts of oil repellant agent were added to 100 parts of 60% by weight of aqueous solution of sulfimethylated alkylresorcine-phenol-formaldehyde co-condensate with stirring to prepare a uniform solution and said solution was impregnated in a porous material (300 g/m² unit weight) which is non woven fabric of fiber mixture (polyester fiber/acrylic fiber =80/20 weight ratio) in an amount of 20 g/m² as solid content. Said porous material in which said solution was impregnated was heated at 60° C. for 10 minutes to put said resin composition in B-stage at then press-molded by heating at 190° C. for 3 minutes to obtain a molded article having a good strength.

EXAMPLE 5

Thirty parts of 50% by weight of aqueous solution of diglycidyl resorcinol type water soluble epoxy resin and 10 parts of wheat flour were added in 100 parts of 50% by weight of aqueous solution of novolak type sulfomethylated alkyl resorcine-formaldehyde pre-condensate to prepare an adhesive. Using said adhesive, a plywood was prepared under the conditions below described.

The properties of the resulting plywood were determined and the results were shown in Table 5.

| Material: | Lauan 2.5 × 2.5 × 2.5 3 ply |
| --- | --- |
| Coating amount: | 35 g/30 × 30 cm |
| Cooling time: | 15 minutes |
| Hot press: | 20° C., 4 minutes, 10 kg/m² |

TABLE 5

| adhesive strength | Normal adhesion (Kg/cm²) | 20.3 (100) |
| --- | --- | --- |
| | After continuous boiling for 72 hrs | 15.1 (100) |
| free formaldehyde (µg/g) | | <0.002 |

( ) Numbers in parentheses show wood failure (%)

Referring to Table 5, a plywood which has an excellent delamination strength and contains small amount of free formaldehyde was obtained.

EXAMPLE 6

Fifteen parts of 40% by weight of glycidylether type aqueous solution of glycidylether type water soluble epoxy resin was added to 100 parts of 40% by weight of sulfimethylated alkyl resorcine-in-cresol-formaldehyde pre-co-condensate to prepare a paint. Said paint was coated or the surface of an iron panel at an amount of 100 g/m² and then dried at 50° C. for 30 minutes followed by curing at 180° C. for 20 minutes. The resulting coating film on said iron panel has a high surface hardness, an excellent adhesiveness, an excellent water resistance, and an excellent weather resistance.

EXAMPLE 7

Fifty parts of polyethyleneglycol diglycidyl ether and oil parts of stearic acid were added to 100 parts of 60% by weight of aqueous solution of sulfimethylated alkyl resorcine phenol-formaldehyde pre-co-condensate to mix uniformly and the resulting mixture was diluted by water to be 10% by weight of solid content. The resulting aqueous solution was impregnated in a paper by pressing with a roller and then dried at 100 to 120° C. for 5 minutes. Ten pieces said papers were laminated together and molded by hot-pressing of 100 kg/cm² at 200° C. to prepare a laminated panel having an excellent mechanical properties.

EXAMPLE 8

One hundred parts of said resin composition prepared in EXAMPLE 1 was sprayed to 100 parts of mixture of wood flake and wood powder (80:20 weight ratio) and mixed by stirring. The resulting mixture was scattered on the lower mold part of the press-molding machine to form a mat and said mat was press-molded between the lower mold part and the upper mold part at 180° C. for 5 minutes with a pressing pressure 3 kg/cm² to prepare a wood fiber panel. Said wood fiber panel has a high strength and small amount of free formaldehyde.

EXAMPLE 9

Formaldehyde sodium sulfoxylate (Rongalit) (0.4 moles) and 1 mole of caustic soda were added to 1 mole of bisphenol A with water and reacted at 50° C. for 2 hours and then at a temperature between 95 and 100° C. for 5 hours. After that 1.7 moles of epichlorohydrin and 1.5 moles of caustic soda were added and reacted at a temperature between 50 and 60° C. for 5 hours followed by separation of water and impurities to prepare sulfimethylated epoxy resin (E).

Twenty-five parts of 60% by weight of aqueous solution of phenol-formaldehyde pre-condensate, 5 parts of 40% by weight of paraffin wax emulsion and 400 parts of water were added to 70 parts of said sulfimethylated epoxy resin (E) to mix uniformly to prepare an aqueous dispersion. Said aqueous dispersion was sprayed to glass fiber (coating amount: 10% by weight for glass fiber).

After said spray coating, said glass fiber was dried at a temperature between 80 and 90° C. for 10 minutes to remove water therein and then molded by hot-press at 180° C. for 5 minutes to prepare a molded article having a high rigidity.

EXAMPLE 10

Phenol (1 mole), 37% by weight aqueous solution of formaldehyde (1.5 moles), caustic soda (0.1 moles) and sodium sulfite (0.3 moles) were mixed and reacted together at 85° C. for 8 hours to produce sulfimethylated phenol-formaldehyde pre-condensate (F), 10 parts of melamine was added to 100 parts of said pre-condensate (F) (solid content 50% by weight) by stirring to mix uniformly and further 50 parts of sulfimethylated epoxy resin (E) prepared in EXAMPLE 9 was added. The resulting mixture was impregnated in glass fiber mat (unit weight 300 g/m$^2$) in an amount of 200 g/m$^2$ and said mat was dried at 80° C. for 20 minutes followed by hot pressing at 170° C. for 5 minutes to prepare a molded article having a high rigidity.

EXAMPLE 11

Phenol (1 mole), 37% by weight aqueous solution of formaldehyde (1.5 moles), caustic soda (0.1 moles), and sodium sulfite (0.3 moles) were mixed and reacted together at 85° C. for 7 hours to produce sulfomethylated phenolic resin pre-condensate and then urea (0.5 moles) was added to said pre-condensate to react together for 2 hours to produce sulfomethylated phenol-urea-formaldehyde pre-co-condensate. One hundred parts of sulfimethylated epoxy resin (E) prepared in EXAMPLE 9 and 300 parts of water were added to 100 parts of said pre-condensate (solid content 45%) by stirring to prepare an uniform solution. Said solution was coated to glass fiber mat (unit weight 40 g/m$^2$) by a spray in an amount of 100 g/m$^2$. After coating, said mat was dried at 100° C. for 5 minutes and then a pair of said mats were put on the both sides of a corrugated board. The resulting laminated board was molded by hot-pressing at 160° C. for 2 minutes to prepare a molded article having a high rigidity.

Industrial Applicability

The present invention provides a resin composition emitting less toxic material such as free formaldehyde and free phenol when and after said resin composition is molded and said resin composition is cured at a low temperature, and being useful as molding material, binder adhesive, paint and the like.

What is claimed is:

1. A molding material comprising a porous material impregnated with a resin composition comprising a mixture of an aqueous solution of a phenolic resin and an epoxy compound wherein said phenolic resin is partially or wholly sulfoalkylated and/or sulfialkylated.

2. The molding material in accordance with claim 1, wherein said phenolic resin is co-condensate with aminoplast monomer and/or its precondensate.

3. The molding material in accordance with claim 1, wherein said mixture is mixed with aminoplast and/or its aminoplast monomer.

4. The molding material in accordance with claim 1, wherein said epoxy compound is dispersed or emulsified in water and then mixed in said aqueous solution of phenoric resin.

5. The molding material in accordance with claim 1, wherein said epoxy compound is an epoxy resin.

6. A molded article manufactured by molding said molding material in accordance with claims 1, with heating in a designated shape to cure said resin composition in said molding material.

7. A molding material comprising a porous material impregnated with a resin composition comprising a mixture of an aqueous solution of a phenolic resin and an epoxy compound wherein said epoxy compound is an epoxy resin and wherein said epoxy resin has aryl group and said aryl group is partially or wholly sulfoalkylated and/or sulfialkylated.

8. A molding material comprising chip and/or powder and/or fiber material, in which a resin composition comprising a mixture of an aqueous solution of a phenolic resin and an epoxy compound is mixed as a binder wherein said phenolic resin is partially or wholly sulfoalkylated and/or sulfialkylated.

9. The molding material in accordance with claim 8, wherein said phenolic resin is co-condensate with aminoplast monomer and/or its precondensate.

10. The molding material in accordance with claim 8, wherein said mixture is mixed with aminoplast and/or its aminoplast monomer.

11. The molding material in accordance with claim 8, wherein said epoxy compound is dispersed or emulsified in water and then mixed in said aqueous solution of phenolic resin.

12. The molding material in accordance with claim 8 wherein said epoxy compound is an epoxy resin.

13. The molded article manufactured by molding said molding material in accordance with claim 8 with heating in a designated shape to cure said resin composition in said molding material.

14. A molding material comprising chip and/or powder and/or fiber material, in which a resin composition comprising a mixture of an aqueous solution of a phenolic resin and an epoxy compound is mixed as a binder wherein said epoxy compound is an epoxy resin and wherein said epoxy resin has an aryl group and said aryl group is partially or wholly sulfoalkylated and/or sulfialkylated.

* * * * *